US012744464B2

(12) United States Patent
Fletcher et al.

(10) Patent No.: US 12,744,464 B2
(45) Date of Patent: Sep. 22, 2026

(54) IN-SYSTEM TUNING OF MULTI-PHASE POWER CONVERTER CIRCUITS

(71) Applicant: Apple Inc., Cupertino, CA (US)

(72) Inventors: Jay B. Fletcher, Saratoga, CA (US); Sanjay Pant, Santa Clara, CA (US); Shawn Searles, Austin, TX (US)

(73) Assignee: Apple Inc., Cupertino, CA (US)

( * ) Notice: Subject to any disclaimer, the term of this patent is extended or adjusted under 35 U.S.C. 154(b) by 122 days.

(21) Appl. No.: 18/808,994

(22) Filed: Aug. 19, 2024

(65) Prior Publication Data

US 2026/0051821 A1 Feb. 19, 2026

(51) Int. Cl.
*H02M 3/158* (2006.01)

(52) U.S. Cl.
CPC ................................ *H02M 3/1584* (2013.01)

(58) Field of Classification Search
CPC .......................... H02M 3/1584; H02M 3/1586
USPC .......................................................... 323/271
See application file for complete search history.

(56) References Cited

U.S. PATENT DOCUMENTS 10,418,904 B2 9/2019 Takahashi
10,476,403 B2 * 11/2019 Deboy ..................... H02J 3/40
11,264,908 B1 * 3/2022 Beltran ................... G06F 3/015
11,462,946 B2 10/2022 Nakanishi et al.
11,527,947 B2 12/2022 Iwabuki et al.
2020/0119648 A1 * 4/2020 Lee ....................... H02M 3/158
2022/0286053 A1 * 9/2022 Agrawal ............. H02M 3/1584
2023/0047484 A1 * 2/2023 Kolar ................. H02M 1/0025

FOREIGN PATENT DOCUMENTS

CN 111313398 A 6/2020
CN 115811040 A 3/2023
CN 116707269 A 9/2023
CN 117220504 A 12/2023
TW 201914144 A 4/2019

* cited by examiner

*Primary Examiner* — Yemane Mehari
(74) *Attorney, Agent, or Firm* — DICKINSON WRIGHT RLLP

(57) ABSTRACT

A tunable multi-phase power converter circuit that includes multiple phase circuits coupled to a regulated power supply node via corresponding inductors is disclosed. A control circuit may, during a first time period, activate a particular phase circuit to source a current to the regulated power supply node, and measure a first value of a parameter associated with the regulated power supply node. The control circuit may, during a second time period, activate a different phase circuit source a different current to the regulated power supply node, and measure a second value of the parameter. Additionally, the control circuit may perform a comparison of the first and second values, and adjust one or more operating characteristics of the different phase circuit using a result of the comparison.

20 Claims, 8 Drawing Sheets

IN-SYSTEM TUNING OF MULTI-PHASE POWER CONVERTER CIRCUITS

FIELD

This disclosure relates to power management in computer systems and, more particularly, to the tuning of multi-phase power converter circuits.

BACKGROUND

Modern computer systems include multiple circuit blocks designed to perform various functions. For example, such circuit blocks may include processors or processor cores configured to execute software or program instructions. Additionally, the circuit blocks may include memory circuits, mixed-signal or analog circuits, and the like.

In some computer systems, the circuits blocks may be designed to operate using different power supply voltage levels. For example, in some computer systems, power circuits (also referred to as "power management units") may generate and monitor various power supply signals. Such power circuits may be located on a common integrated circuit with a processor circuit, memory circuit, and the like. Alternatively, power circuits may be located on different integrated circuits from the processor circuit, memory circuit, etc.

Power circuits often include one or more power converter circuits that can generate regulated voltage levels on respective power supply signal nodes. Such power converter circuits may employ multiple reactive circuit elements such as inductors, capacitors, and the like.

DETAILED DESCRIPTION

Figure 1:
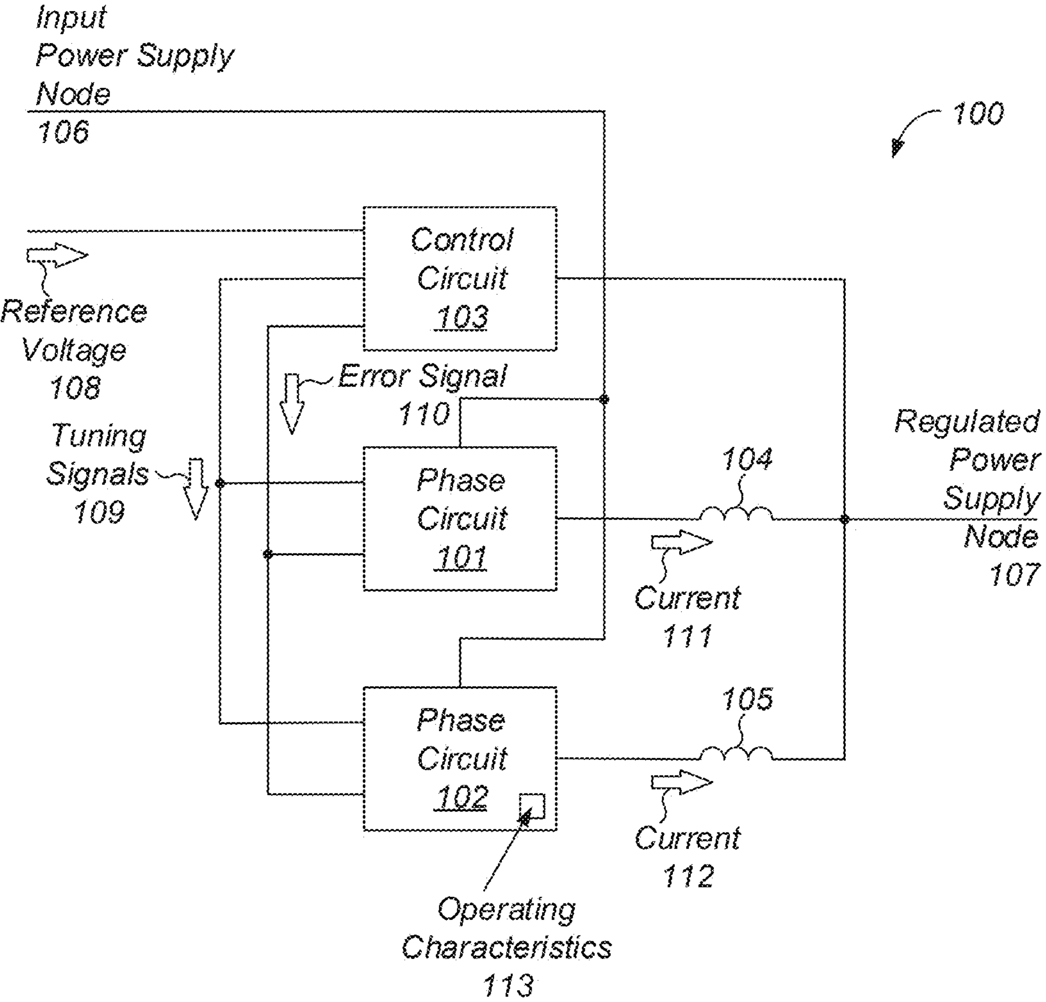
FIG. 1 is a block diagram depicting an embodiment of a multi-phase power converter circuit for a computer system.

Computer systems may include multiple circuit blocks configured to perform specific functions. Such circuit blocks may operate together to form a "host device" that acts as a server offering information resources, services, and applications to users or other devices on a network. The circuit blocks may be fabricated on a common substrate and may employ different power supply voltage levels.

Power circuits (also referred to as "power management units" or "PMUs") are used to generate different power supply voltage levels for the different circuit blocks in a computer system. In some cases, the power circuits may be located on dedicated integrated circuits, and may be referred to as "power management integrated circuits" or "PMICs."

Power circuits can include multiple power converter circuits or voltage regulator circuits configured to generate regulated voltage levels for various power supply signals. Such voltage regulator circuits may employ both passive circuit elements (e.g., inductor, capacitors, etc.) as well as active circuit elements (e.g., transistors, diodes, etc.). Power circuits may be adjusted during operation to achieve desired voltage levels on power supply nodes during different operating regimes of the computer system. For example, reference voltage levels, regulation modes, clock frequency, etc., may be adjusted to different values as a computer system transitions from an active mode to a sleep or reduced power mode.

In some computer systems, multiple power circuits may be arranged to form a multi-phase power circuit where different ones of multiple power circuits operate for different periods of time. As described above, the different power circuits may be located on different integrated circuits. In some cases, the different integrated circuits may be manufactured using different manufacturing processes, resulting in different baseline electrical properties of the passive and active circuit elements in the different power circuits.

To account for differences in such electrical properties, operating parameters of the power circuits may be adjusted or "trimmed" after manufacture to achieve a desired set of electrical properties or characteristics. Such trimming can include adjustments of transistor transconductance values, changes in timing of signals, and the like. Settings for such adjustments (referred to as "trim values") may be stored in one or more register circuits included in a power circuit.

In some multi-chip implementations, however, trimming the various power circuits may not be practical once the computer system is assembled, and pre-assembly trimming may be inaccurate due to effects, e.g., parasitic resistances, resulting from the assembly of the computer system. Moreover, as the computer system ages, electrical properties of some of the components may change, resulting in degraded performance over time.

The embodiments illustrated in the drawings and described below provide techniques for post-assembly trimming of power circuits included in a multi-phase power circuit using one of the power circuits that has been previously trimmed as a reference. By comparing one or more parameters associated with the operation of the different power circuits to the previously trimmed power circuit in a sequential fashion, respective trim values can be determined for the different power circuits to achieve the desired electrical characteristics.

A block diagram of a multi-phase power converter circuit is depicted in FIG. 1. As illustrated, multi-phase power converter circuit 100 includes phase circuits 101-102, control circuit 103, and inductors 104-105. In various embodiments, phase circuit 101 may be trimmed prior to assembly of multi-phase power converter circuit 100, while phase circuit 102 may be untrimmed post-assembly of multi-phase power converter circuit 100.

Phase circuit 101 is coupled to regulated power supply node 107 via inductor 104. In various embodiments, phase circuit 101 is configured, in response to being activated, to source current 111 to regulated power supply node 107 via inductor 104. In some embodiments, phase circuit 101 may be further configured to source current 111 using a voltage level of input power supply node 106 and error signal 110.

Phase circuit 102 is coupled to regulated power supply node 107 via inductor 105. In various embodiments, phase circuit 102 is configured, in response to being activated, to source current 112 to regulated power supply node 107 via inductor 105. In some embodiments, phase circuit 102 may be further configured to source current 112 using the voltage level of input power supply node 106 and error signal 110.

Control circuit 103 is configured to generate error signal 110 using a voltage level of regulated power supply node 107 and reference voltage 108. Additionally, control circuit 103 is also configured to activate, during a first time period, phase circuit 101, and activate, during a second time period, phase circuit 102. In some embodiments, the second time period is subsequent to the first time period.

In various embodiments, control circuit 103 may be used to tune (or "trim") untrimmed phase circuits, e.g., phase circuit 102, by measuring one or more parameters associated with regulated power supply node 107. Such a tuning operation may be performed each time a boot operation is performed on a computer system that includes multi-phase power converter circuit 100. Alternatively, or additionally, the tuning operation may be performed in response to a user request, or may be performed at periodic intervals.

During a tuning operation, control circuit 103 may be configured to measure, during the first time period, at least one parameter of regulated power supply node 107 to generate a first value, and measure, during the second time period, the at least one parameter to generate a second value. In various embodiments, the at least one parameter may correspond to either current 111 or current 112. Alternatively, or additionally, the at least one parameter may correspond to a voltage level of regulated power supply node 107, respective durations that currents 111 and 112 are sourced, or any other suitable parameter associated with regulated power supply node 107.

As described below, control circuit 103 may be configured to take multiple measurements within the first and second time periods. In such cases, control circuit 103 may be configured to perform one or more operations using the multiple measurements. For example, control circuit 103 may be configured to determine a maximum value, determine a minimum value, determine an average value, determine a slope of the at least one parameter over the time periods, or any other suitable operation.

Control circuit 103 is also configured, during the tuning operation, to perform a comparison of the first value and the second value. Additionally, control circuit 103 is configured to adjust operating characteristics 113 of phase circuit 102. To adjust operating characteristics 113, control circuit 103 may be configured to generate tuning signals 109. In some embodiments, tuning signals 109 may include a trim value that can be stored in phase circuit 102.

In some cases, control circuit 103 may perform repeated activations of phase circuit 102 based on the result of the comparison. In various embodiments, control circuit 103 may iteratively tune phase circuit 102 until the difference between the first value and the second value is less than a threshold value.

Inductors 104 and 105 may, in various embodiments, be fabricated on a same integrated circuit as phase circuits 101 and 102, respectively. In other embodiments, inductors 104 and 105 may be discrete inductors mounted on a substrate or circuit board along with phase circuits 101 and 102.

Figure 2:
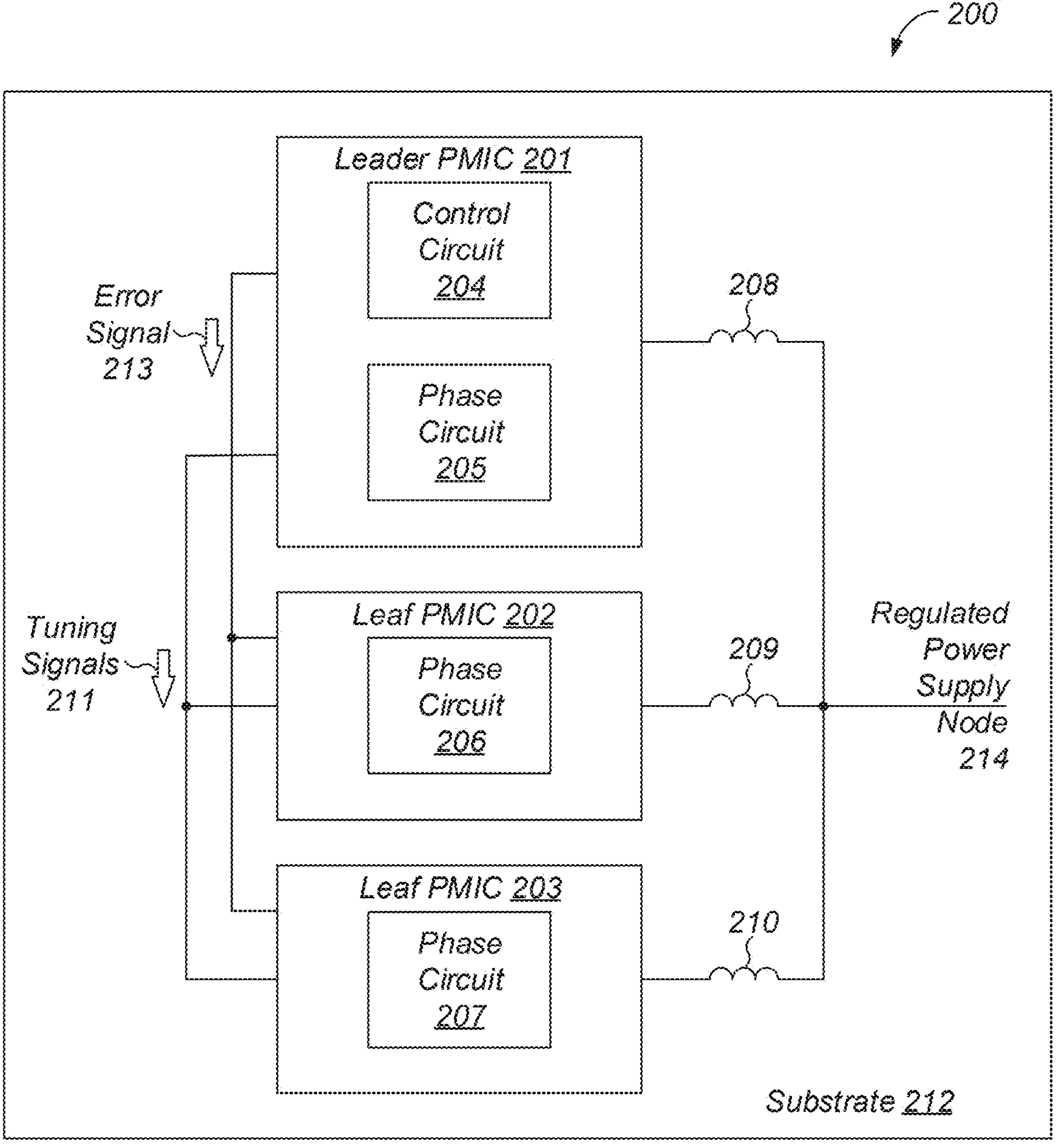
FIG. 2 is a block diagram depicting an embodiment of a power supply subsystem for computer system.

Turning to FIG. 2, a block diagram of a power supply subsystem for a computer system is depicted. As illustrated, power supply subsystem 200 includes leader power management integrated circuit 201 (denoted as "Leader PMIC 201"), leaf power management integrated circuits 202 and 203 (denoted "Leaf PMIC 202" and "Leaf PMIC 203", respectively), and inductors 208-210. In various embodiments, leader PMIC 201, leaf PMIC 202, leaf PMIC 203, and inductors 208-210 may be mounted on substrate 212. In some cases, substrate 212 may be implemented as a circuit board that includes one or more layers.

Leader PMIC 201 includes control circuit 204 and phase circuit 205, which is coupled to regulated power supply node 214 via inductor 208. In various embodiments, control circuit 204 corresponds to control circuit 103, and regulated power supply node 214 may correspond to regulated power supply node 107 as depicted in FIG. 1, and is configured to generate tuning signals 211 and error signal 213, which correspond to tuning signals 109 and error signal 110, respectively.

Additionally, phase circuit 205 may correspond to phase circuit 101 as depicted in FIG. 1. It is noted that, in some embodiments, phase circuit 205 may be trimmed prior to the assembly of power supply subsystem 200.

Leaf PMIC 202 includes phase circuit 206 which is coupled to regulated power supply node 214 via inductor 209. In various embodiments, phase circuit 206 may correspond to an instance of phase circuit 102 as depicted in the embodiment of FIG. 1.

Leaf PMIC 203 includes phase circuit 207 which is coupled to regulated power supply node 214 via inductor 210. In various embodiments, phase circuit 207 may correspond to an instance of phase circuit 102 as depicted in the embodiment of FIG. 1.

Although only two leaf PMICs are depicted in the embodiment of FIG. 2, in other embodiments, any suitable number of lead PMICs, with corresponding phase circuits, may be employed. It is noted that although inductors 208-210 are depicted as being separate from leader PMIC 201 and leaf PMICs 202 and 203, in other embodiments, one or more of inductors 208-210 may be included in corresponding ones of leader PMIC 201 and leaf PMICs 202 and 203.

Figure 3:
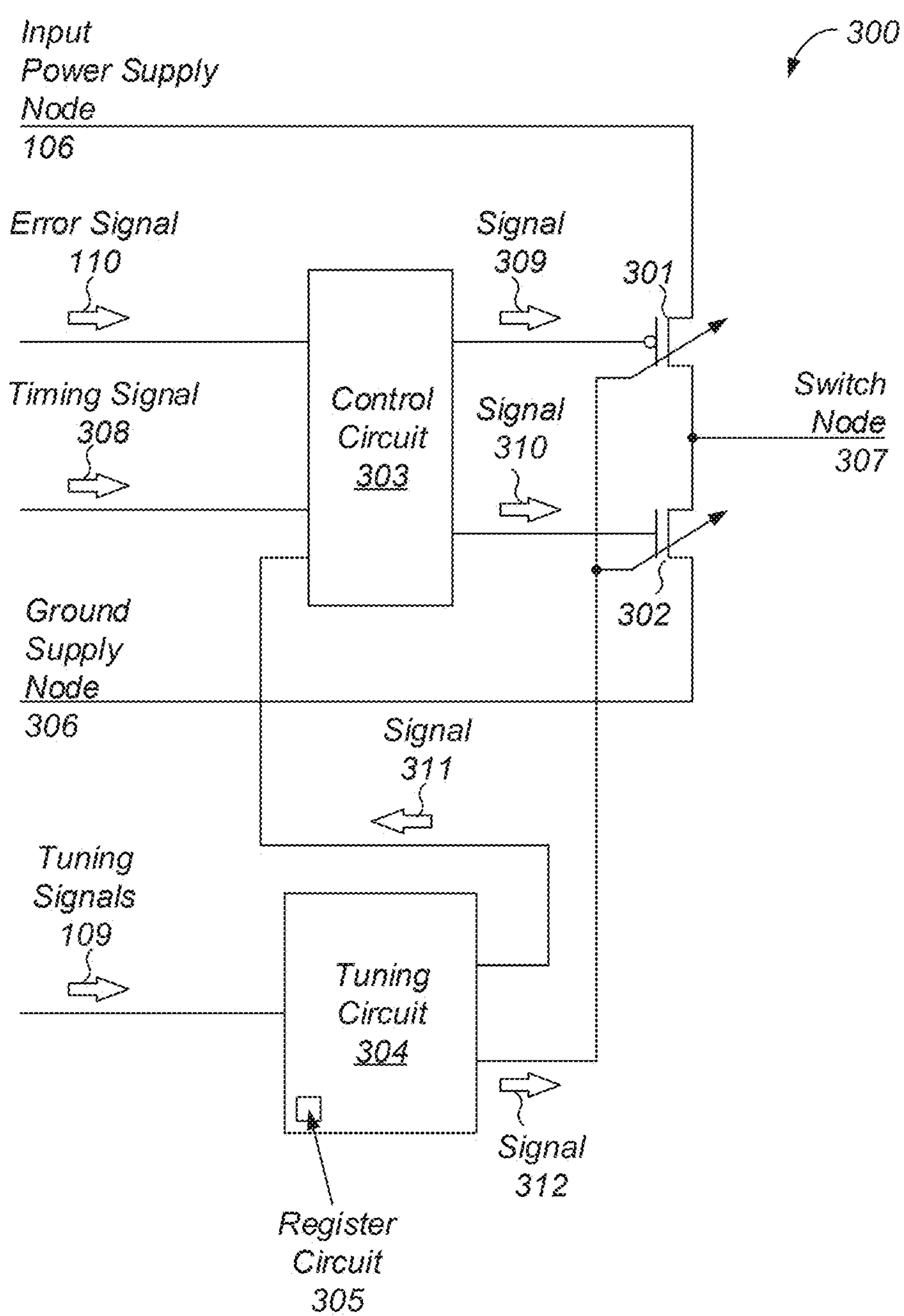
FIG. 3 is a block diagram depicting an embodiment of a phase circuit for a multi-phase power converter circuit.

A block diagram of an embodiment of a phase circuit is depicted in FIG. 3. In various embodiments, phase circuit 300 may correspond to any of phase circuits 101, 102, or 205-207. As illustrated, phase circuit 300 includes transistors 301 and 302, control circuit 303, and tuning circuit 304.

Transistor 301 is coupled between input power supply node 106 and switch node 307, which is, in turn, coupled to regulated power supply node 107 via an inductor, e.g., inductor 104. Transistor 302 is coupled between switch node 307 and ground supply node 306. In various embodiments, transistor 301 is controlled by signal 309, and transistor 302 is controlled by signal 310.

In response to signal 309 being activated, transistor 301 couples switch node 307 to input power supply node 106, allowing a current to flow from input power supply node 106 into switch node 307 and on into regulated power supply node 107. During this time, the inductor between switch node 307 and regulated power supply node 107 is magnetized. In response to signal 309 being deactivated, transistor 301 decouples switch node 307 from input power supply node 106, thereby halting the flow of current.

In response to signal 310 being activated, transistor 302 couples switch node 307 to ground supply node 306. During this time, the inductor between switch node 307 and regulated power supply node 107 is demagnetized. As the magnetic field of the inductor collapses, a current is induced into regulated power supply node 107. In response to signal 310 being deactivated, transistor 302 decouples switch node 307 from ground supply node 306.

Transistor 301 may be implemented as a p-channel metal-oxide semiconductor field-effect transistor (MOSFET), a fin field-effect transistor (FinFET), a gate-all-around field-effect transistor (GAAFET), or any other suitable transconductance device. Transistor 302 may be implemented as an n-channel MOSFET, FinFET, GAAFET, or any other suitable transconductance device. Although depicted as single transistors, in other embodiments, transistors 301 and 302 may be implemented using multiple transistors coupled together in series.

Control circuit 303 is configured to generate signals 309 and 310 using error signal 110 and timing signal 308. In various embodiments, timing signal 308 may be a clock signal or other suitable timing reference for control circuit 303. Based on a type of regulation mode employed, control circuit 303 is configured to activate signal 309 and deactivate signal 310 during an on-state of a regulation cycle, and deactivate signal 309 and activate signal 310 during an off-state of the regulation cycle. In various embodiments, control circuit 303 may be implemented using any suitable combination of sequential and combinatorial logic circuits, and may employ any suitable regulation method, such as current-mode or voltage-mode pulse width modulation.

Tuning circuit 304 includes register circuit 305, and is configured to generate signals 311 and 312 using tuning signals 109. As described above, tuning signals 109 may include a trim value which tuning circuit 304 is configured to store in register circuit 305.

In various embodiments, the trim value encoded in tuning signals 109 may be used to adjust the transconductance of transistors 301 and 302 via signal 312. In various embodiments, signal 312 may be a digital signal that includes multiple bits which can activate or deactivate different ones of multiple transistors used to implement transistors 301 and 302 in order to change respective transconductance values of transistors 301 and 302. In other embodiments, signal 312 may include one or more analog signals used to adjust respective bias points of transistors 301 and 302.

Tuning circuit 304 may, in some embodiments, use the trim value encoded in tuning signals 109 to generate signal 311. In various embodiments, control circuit 303 may adjust one or more aspects of a regulation cycle using signal 311. For example, control circuit 303 may adjust error signal 110 or timing signal 308 using signal 311. In various embodiments, signal 311 may be a digital signal that includes one or more bits while, in other embodiments, signal 311 may be an analog signal.

Although the embodiment of FIG. 3 depicts a buck converter circuit, in other embodiments, phase circuit 300 may be implemented as a boost converter circuit, a buck-boost converter circuit, a low-dropout regulator circuit, or any other suitable power converter or regulator circuit.

Figure 4:
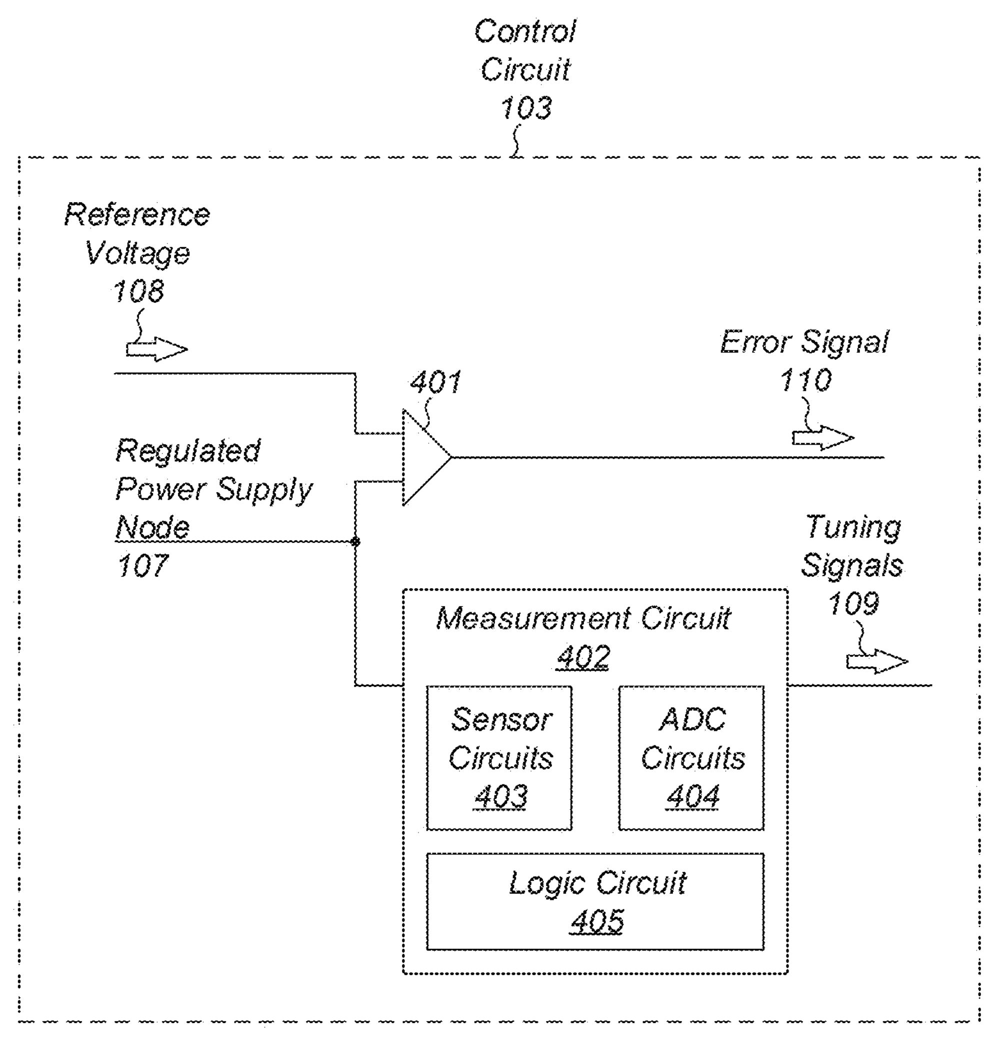
FIG. 4 is a block diagram depicting an embodiment of a control circuit for a multi-phase power converter circuit.

Turning to FIG. 4, a block diagram of an embodiment of control circuit 103 is depicted. As illustrated, control circuit 103 includes comparator circuit 401 and measurement circuit 402.

Comparator circuit 401 is configured to generate error signal 110 using reference voltage 108 and a voltage level of regulated power supply node 107. In various embodiments, to generate error signal 110, comparator circuit 401 is configured to generate error signal 110 such that a value of error signal 110 is proportional to a difference between reference voltage 108 and the voltage level of regulated power supply node 107. In other embodiments, error signal 110 may be a current whose value is proportion to the difference between reference voltage 108 and the voltage level of regulated power supply node 107.

Measurement circuit 402 is configured to generate tuning signals 109 using either a voltage level of regulated power supply node 107, or a current flowing into regulated power supply node 107 from a given phase circuit. In various embodiments, tuning signals 109 may be a digital signal including multiple bits that may encode a trim value for a given phase circuit.

In various embodiments, measurement circuit 402 includes sensor circuits 403, analog-to-digital converter circuits (denoted as "ADC circuits 404"), and logic circuit 405. Sensor circuits 403 may include multiple sensors configured to measure different parameters associated with regulated power supply node 107 at different points in time. As described above, sensors circuits 403 may be configured to measure voltages or currents associated with regulated power supply node 107. In other cases, sensor circuits 403 may be configured to sample such voltages or currents at multiple times during active periods of respective phase circuits.

ADC circuits 404 are configured to convert samples generated by sensor circuits 403 into digital words. In various embodiments, ADC circuits 404 may generate digital words using any suitable number of bits to allow sufficient resolution to measure a desired parameter, e.g., a slope of the voltage level of regulated power supply node 107. ADC circuits 404 may be implemented using any suitable analog-to-digital converter circuit topology.

Logic circuit 405 is configured to generate tuning signals 109 using digital words generated by ADC circuits 404. In various embodiments, logic circuit 405 may be configured to post-process the digital words prior to generating tuning signals 109. For example, in some cases, logic circuit 405 may be configured to determine a maximum or minimum value of the sampled parameter over an active period of a phase circuit, and then use the determined maximum or minimum value to determine a trim value encoded in tuning signals 109. Alternatively, logic circuit 405 may be configured to determine an average value of the parameter, a rate-of-change (or slope) of the parameter, or any other suitable characteristic of the parameter. In various embodiments, logic circuit 405 may be implemented using any suitable combination of combinatorial and sequential logic circuits.

To summarize, various embodiments of a multi-phase power converter circuit are disclosed. Broadly speaking, a multi-phase power converter circuit may include a first phase circuit coupled to a regulated power supply node via a first inductor, where the first phase circuit is configured, in response to being activated, to supply a first current to the regulated power supply node via the first inductor. The multi-phase power converter circuit may also include a second power converter circuit coupled to the regulated power supply node via a second inductor, where the second power converter circuit is configured, in response to being activated, to supply a second current to the regulated power supply node via the second inductor. A control circuit included in the multi-phase power converter circuit may be configured to activate, during a first time period, the first phase circuit, and measure, during the first time period, at least one parameter of the regulated power supply node to generate a first value. The control circuit may be further configured to activate, during a second time period subsequent to the first time period, the second phase circuit, and measure, during the second time period, the at least one parameter of the regulated power supply node to generate a second value. Additionally, the control circuit may be configured to perform a comparison of the first value and the second value, and adjust one or more operating characteristics of the second phase circuit using a result of the comparison.

Figure 5:
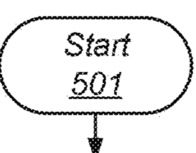
FIG. 5 is a flow diagram depicting an embodiment of a method for tuning a multi-phase power converter circuit.

Turning to FIG. 5, a flow diagram depicting an embodiment of a method for tuning a multi-phase power converter circuit is illustrated. The method, which may be applied to various multi-phase power converter circuits, e.g., multi-phase power converter circuit 100 as depicted in FIG. 1, begins in block 501.

The method includes activating, by a control circuit during a first time period, a first phase circuit of a plurality of phase circuits included in a multi-phase power converter circuit (block 502). In various embodiments, the first phase circuit is coupled to a regulated power supply node via a first inductor. In some cases, the first phase circuit has been trimmed post-manufacture.

The method also includes measuring, by the control circuit during the first time period, at least one parameter associated with the regulated power supply node to generate a first value (block 503). In some embodiments, measuring, by the control circuit during the first time period, the at least one parameter includes measuring a first current sourced by the first phase circuit to the regulated power supply node. In other embodiments, measuring, by the control circuit during the first time period, the at least one parameter includes measuring a voltage level of the regulated power supply node.

The method further includes activating, by the control circuit, during a second time period subsequent to the first time period, a second phase circuit of the plurality of phase circuits (block 504). In various embodiments, the second phase circuit is coupled to the regulated power supply node via a second inductor. In some cases, the second phase circuit has not been trimmed prior to being employed in the multi-phase power converter circuit.

In some embodiments, the first phase circuit and the control circuit are located on a common integrated circuit, while the second phase circuit is located on a different integrated circuit. The common integrated circuit and the different integrated circuit may be mounted on a common substrate or circuit board along with the first and second inductors. Although the method describes two phase circuits, in other embodiments, any suitable number of phase circuits may be employed.

The method also includes measuring, by the control circuit during the second time period, the at least one parameter to generate a second value (block 505). In various embodiments, measuring, by the control circuit during the second time period, the at least one parameter includes measuring a second current sourced by the second phase circuit to the regulated power supply node. In some embodiments, measuring, by the control circuit during the second time period, the at least one parameter includes measuring a voltage level of the regulated power supply node.

The method further includes performing, by the control circuit, a comparison of the first value and the second value (block 506). In some embodiments, performing the comparison of the first value and the second value includes performing respective analog-to-digital conversion on the first value and the second value.

The method also includes adjusting, by the control circuit, one or more operating parameters of the second phase circuit using a result of the comparison (block 507). In some embodiments, adjusting, by the control circuit, the one or more operating parameters includes generating, by the control circuit, a trim code using the result of the comparison, and storing, by the control circuit, the trim code in the second phase circuit.

In various embodiments, the method also includes adjusting, by the second phase circuit using the trim code, a size of a driver transistor included in the second phase circuit. In various embodiments, the driver transistor is coupled to the second inductor. The method concludes in block 508.

Figure 6:
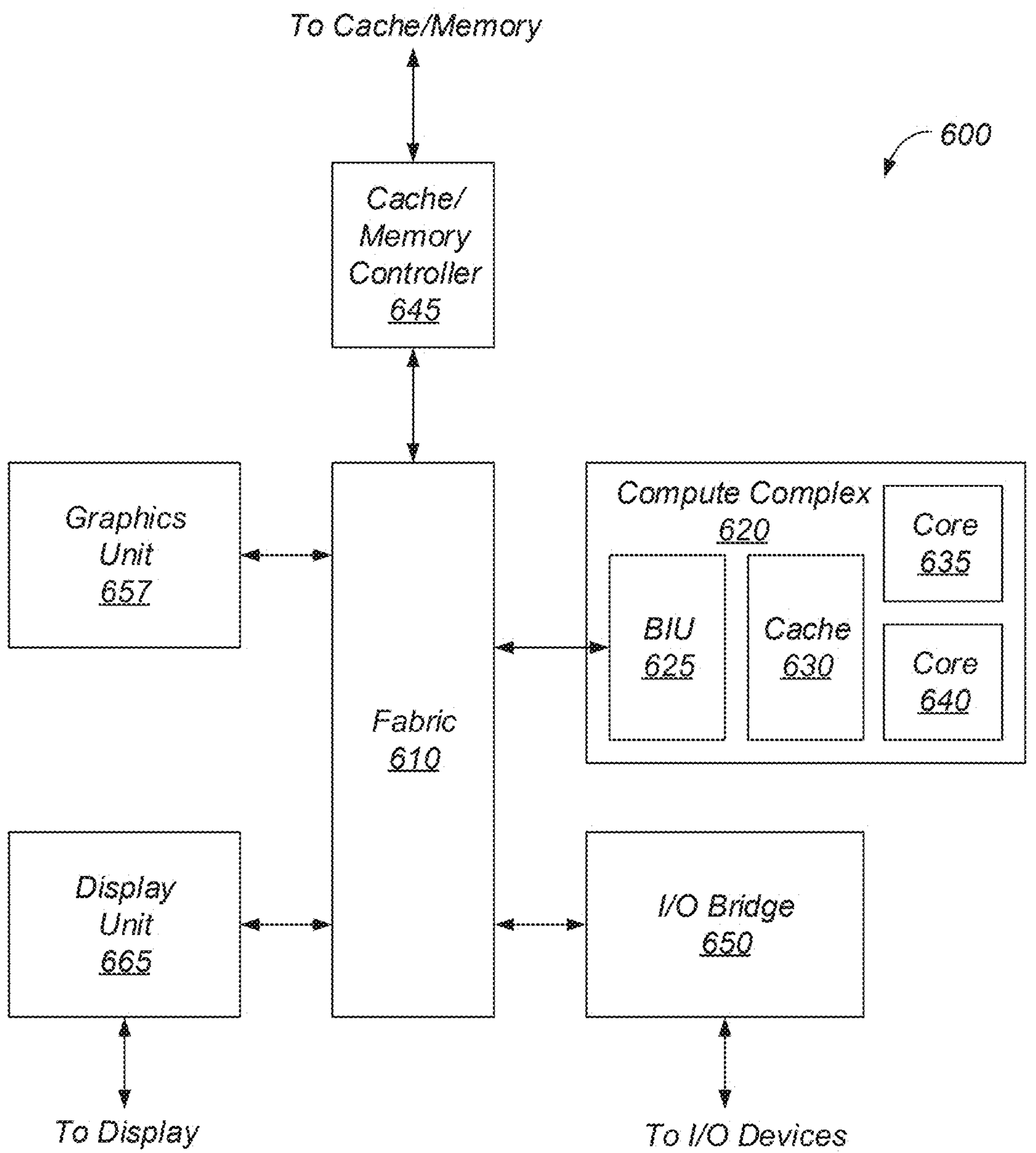
FIG. 6 is a block diagram of an embodiment of a device that may include power converter circuits.

Referring now to FIG. 6, a block diagram illustrating an example embodiment of a device is shown. In some embodiments, elements of device 600 may be included within a system on a chip. In some embodiments, device 600 may be included in a mobile device, which may be battery-powered. Therefore, power consumption by device 600 may be an important design consideration. In the illustrated embodiment, device 600 includes fabric 610, compute complex 620, input/output (I/O) bridge 650, cache/memory controller 645, graphics unit 675, and display unit 665. In some embodiments, device 600 may include other components (not shown) in addition to, or in place of, the illustrated components such as video processor encoders and decoders, image processing or recognition elements, computer vision elements, etc.

Fabric 610 may include various interconnects, buses, MUX's, controllers, etc., and may be configured to facilitate communication between various elements of device 600. In some embodiments, portions of fabric 610 may be configured to implement various different communication protocols. In other embodiments, fabric 610 may implement a single communication protocol, and elements coupled to fabric 610 may convert from the single communication protocol to other communication protocols internally.

In the illustrated embodiment, compute complex 620 includes bus interface unit (BIU) 625, cache 630, and cores 635 and 640. In various embodiments, compute complex 620 may include various numbers of processors, processor cores, and caches. For example, compute complex 620 may include 1, 2, or 4 processor cores, or any other suitable number. In one embodiment, cache 630 is a set associative L2 cache. In some embodiments, cores 635 and 640 may include internal instruction and data caches. In some embodiments, a coherency unit (not shown) in fabric 610, cache 630, or elsewhere in device 600, may be configured to maintain coherency between various caches of device 600. BIU 625 may be configured to manage communication between compute complex 620 and other elements of device 600. Processor cores, such as cores 635 and 640, may be configured to execute instructions of a particular instruction set architecture (ISA) which may include operating system instructions and user application instructions. These instructions may be stored in a computer readable medium such as a memory coupled to cache memory controller 645 as discussed below.

As used herein, the term "coupled to" may indicate one or more connections between elements, and a coupling may include intervening elements. For example, in FIG. 6, graphics unit 675 may be described as "coupled to" a memory through fabric 610 and cache/memory controller 645. In contrast, in the illustrated embodiment of FIG. 6, graphics unit 675 is "directly coupled" to fabric 610 because there are no intervening elements.

Cache/memory controller 645 may be configured to manage transfer of data between fabric 610 and one or more caches and memories. For example, cache/memory controller 645 may be coupled to an L3 cache, which may, in turn, be coupled to a system memory. In other embodiments, cache/memory controller 645 may be directly coupled to a memory. In some embodiments, cache/memory controller 645 may include one or more internal caches. Memory coupled to cache/memory controller 645 may be any type of volatile memory, such as dynamic random access memory (DRAM), synchronous DRAM (SDRAM), double data rate (DDR, DDR2, DDR3, etc.) SDRAM (including mobile versions of SDRAMs such as mDDR3, etc., and/or low power versions of SDRAMs such as LPDDR4, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit in a chip-on-chip configuration, a package-on-package configuration, or a multi-chip module configuration. Memory coupled to cache/memory controller 645 may be any type of non-volatile memory such as NAND flash memory, NOR flash memory, nano RAM (NRAM), magneto-resistive RAM (MRAM), phase change RAM (PRAM), Racetrack memory, Memristor memory, etc. As noted above, this memory may store program instructions executable by compute complex 620 to cause the computing device to perform functionality described herein.

Graphics unit 675 may include one or more processors, e.g., one or more graphics processing units (GPUs). Graphics unit 675 may receive graphics-oriented instructions, such as OPENGL®, Metal®, or DIRECT3D® instructions, for example. Graphics unit 675 may execute specialized GPU instructions or perform other operations based on the received graphics-oriented instructions. Graphics unit 675 may generally be configured to process large blocks of data in parallel, and may build images in a frame buffer for output to a display, which may be included in the device or may be a separate device. Graphics unit 675 may include transform, lighting, triangle, and rendering engines in one or more graphics processing pipelines. Graphics unit 675 may output pixel information for display images. Graphics unit 675, in various embodiments, may include programmable shader circuitry which may include highly parallel execution cores configured to execute graphics programs, which may include pixel tasks, vertex tasks, and compute tasks (which may or may not be graphics-related).

Display unit 665 may be configured to read data from a frame buffer and provide a stream of pixel values for display. Display unit 665 may be configured as a display pipeline in some embodiments. Additionally, display unit 665 may be configured to blend multiple frames to produce an output frame. Further, display unit 665 may include one or more interfaces (e.g., MIPI® or embedded display port (eDP)) for coupling to a user display (e.g., a touchscreen or an external display).

I/O bridge 650 may include various elements configured to implement universal serial bus (USB) communications, security, audio, and low-power always-on functionality, for example. I/O bridge 650 may also include interfaces such as pulse-width modulation (PWM), general-purpose input/output (GPIO), serial peripheral interface (SPI), and inter-integrated circuit (I2C), for example. Various types of peripherals and devices may be coupled to device 600 via I/O bridge 650.

In some embodiments, device 600 includes network interface circuitry (not explicitly shown), which may be connected to fabric 610 or I/O bridge 650. The network interface circuitry may be configured to communicate via various networks, which may be wired, wireless, or both. For example, the network interface circuitry may be configured to communicate via a wired local area network, a wireless local area network (e.g., via Wi-Fi™), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth® or Wi-Fi™ Direct), etc. In various embodiments, the network interface circuitry may provide device 600 with connectivity to various types of other devices and networks.

Figure 7:
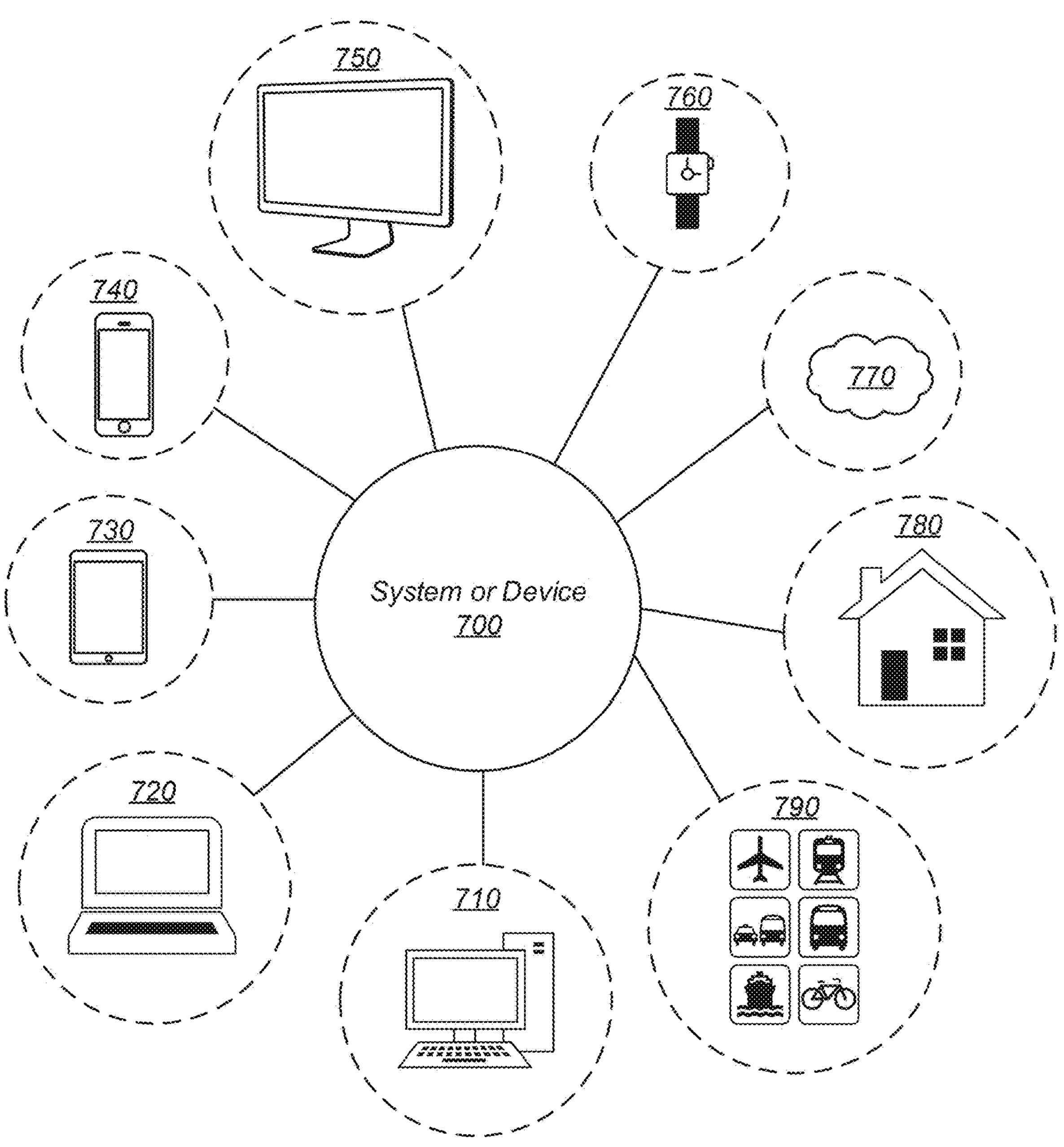
FIG. 7 is a block diagram of various embodiments of computer systems that may include power converter circuits.

Turning now to FIG. 7, various types of systems that may include any of the circuits, devices, or systems discussed above are illustrated. System or device 700, which may incorporate or otherwise utilize one or more of the techniques described herein, may be utilized in a wide range of areas. For example, system or device 700 may be utilized as part of the hardware of systems such as a desktop computer 710, laptop computer 720, tablet computer 730, cellular or mobile phone 740, or television 750 (or set-top box coupled to a television).

Similarly, disclosed elements may be utilized in a wearable device 760, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 700 may also be used in various other contexts. For example, system or device 700 may be utilized in the context of a server computer system, such as a dedicated server or on shared hardware that implements a cloud-based service 770. Still further, system or device 700 may be implemented in a wide range of specialized everyday devices, including devices 780 commonly found in the home such as refrigerators, thermostats, security cameras, etc. The interconnection of such devices is often referred to as the "Internet of Things" (IoT). Elements may also be implemented in various modes of transportation. For example, system or device 700 could be employed in the control systems, guidance systems, entertainment systems, etc. of various types of vehicles 790.

The applications illustrated in FIG. 7 are merely exemplary and are not intended to limit the potential future applications of disclosed systems or devices. Other example applications include, without limitation: portable gaming devices, music players, data storage devices, unmanned aerial vehicles, etc.

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that programs a computing system to generate a simulation model of the hardware circuit, programs a fabrication system configured to produce hardware (e.g., an integrated circuit) that includes the disclosed circuitry, etc. Claims to such a storage medium are intended to cover, for example, an entity that produces a circuit design, but does not itself perform complete operations such as design simulation, design synthesis, circuit fabrication, etc.

Figure 8:
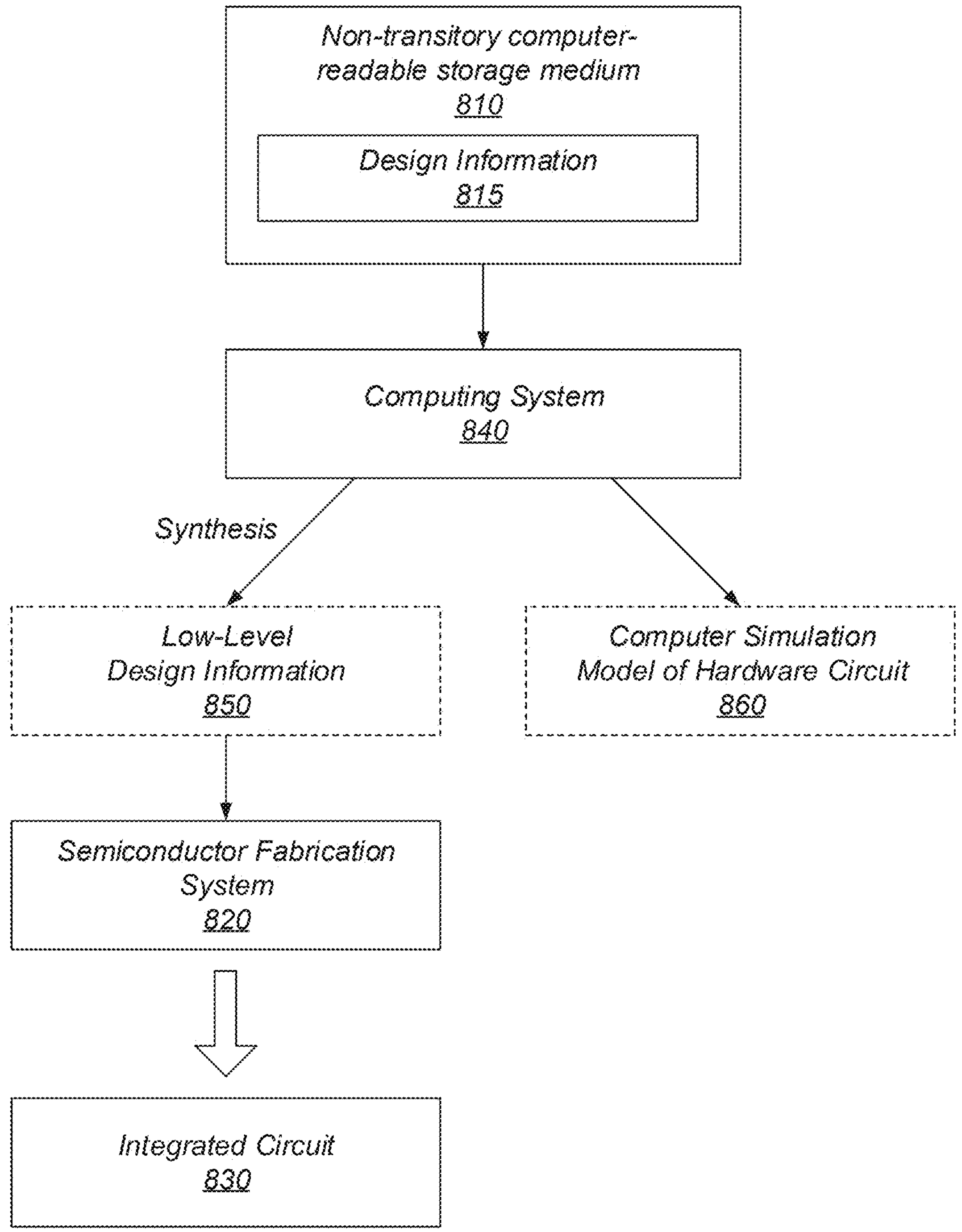
FIG. 8 illustrates an example of a non-transitory computer-readable storage medium that stores circuit design information.

FIG. 8 is a block diagram illustrating an example of a non-transitory computer-readable storage medium that stores design information 815, according to some embodiments. In the illustrated embodiment, computing system 840 is configured to process design information 815. This may include executing instructions included in design information 815, interpreting instructions included in design information 815, compiling, transforming, or otherwise updating design information 815, etc. Therefore, design information 815 controls computing system 840 (e.g., by programming computing system 840) to perform various operations discussed below, in some embodiments.

In the illustrated example, computing system 840 processes design information 815 to generate both computer simulation model of hardware circuit 860 and low-level design information 850. In other embodiments, computing system 840 may generate only one of these outputs, may generate other outputs based on design information 815, or both. Regarding computer simulation model of hardware circuit 860, computing system 840 may execute instructions of a hardware description language that includes register transfer level (RTL) code, behavioral code, structural code, or some combination thereof. The simulation model may perform the functionality specified by design information 815, facilitate verification of the functional correctness of the hardware design, generate power consumption estimates, generate timing estimates, etc.

In the illustrated example, computing system 840 also processes design information 815 to generate low-level design information 850 (e.g., gate-level design information, a netlist, etc.). This may include synthesis operations, as shown, such as constructing a multi-level network, optimizing the network using technology-independent techniques, technology dependent techniques, or both, and outputting a network of gates (with potential constraints based on available gates in a technology library, sizing, delay, power, etc.). Based on low-level design information 850 (potentially among other inputs), semiconductor fabrication system 820 is configured to fabricate integrated circuit 830 (which may correspond to functionality of the computer simulation model of hardware circuit 860). Note that computing system 840 may generate different simulation models based on design information at various levels of description, including low-level design information 850, design information 815, and so on. The data representing low-level design information 850 and computer simulation model of hardware circuit 860 may be stored on non-transitory computer-readable storage medium 810, or on one or more other media.

In some embodiments, low-level design information 850 controls (e.g., programs) semiconductor fabrication system 820 to fabricate integrated circuit 830. Thus, when processed by the fabrication system, the design information may program the fabrication system to fabricate a circuit that includes various circuitry disclosed herein.

Non-transitory computer-readable storage medium 810 may comprise any of various appropriate types of memory devices or storage devices. Non-transitory computer-readable storage medium 810 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash memory, magnetic media, e.g., a hard drive, or optical storage; registers, or other similar types of memory elements, etc. Non-transitory computer-readable storage medium 810 may include other types of non-transitory memory as well, or combinations thereof. Accordingly, non-transitory computer-readable storage medium 810 may include two or more memory media, which may reside in different locations—for example, in different computer systems that are connected over a network.

Design information 815 may be specified using any of various appropriate computer languages, including hardware description languages such as, without limitation: VHDL, Verilog, SystemC, SystemVerilog, RHDL, M, MyHDL, etc. The format of various design information may be recognized by one or more applications executed by computing system 840, semiconductor fabrication system 820, or both. In some embodiments, design information 815 may also include one or more cell libraries that specify the synthesis, layout, or both of integrated circuit 830. In some embodiments, design information 815 is specified in whole, or in part, in the form of a netlist that specifies cell library elements and their connectivity. Design information discussed herein, taken alone, may or may not include sufficient information for fabrication of a corresponding integrated circuit. For example, design information may specify the circuit elements to be fabricated but not their physical layout. In this case, design information may be combined with layout information to actually fabricate the specified circuitry.

Integrated circuit 830 may, in various embodiments, include one or more custom macrocells, such as memories, analog or mixed-signal circuits, and the like. In such cases, design information 815 may include information related to included macrocells. Such information may include, without limitation, schematics capture database, mask design data, behavioral models, and device or transistor level netlists. Mask design data may be formatted according to graphic data system (GDSII), or any other suitable format.

Semiconductor fabrication system 820 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 820 may also be configured to perform various testing of fabricated circuits for correct operation.

In various embodiments, integrated circuit 830 and computer simulation model of hardware circuit 860 are configured to operate according to a circuit design specified by design information 815, which may include performing any of the functionality described herein. For example, integrated circuit 830 may include any of various elements shown in FIG. 1-4. Further, integrated circuit 830 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components. Similarly, stating "instructions of a hardware description programming language" that are "executable" to program a computing system to generate a computer simulation model does not imply that the instructions must be executed in order for the element to be met, but rather, specifies characteristics of the instructions. Additional features relating to the model (or the circuit represented by the model) may similarly relate to characteristics of the instructions, in this context. Therefore, an entity that sells a computer-readable medium with instructions that satisfy recited characteristics may provide an infringing product, even if another entity actually executes the instructions on the medium.

Note that a given design, at least in the digital logic context, may be implemented using a multitude of different gate arrangements, circuit technologies, etc. As one example, different designs may select or connect gates based on design tradeoffs (e.g., to focus on power consumption, performance, circuit area, etc.). Further, different manufacturers may have proprietary libraries, gate designs, physical gate implementations, etc. Different entities may also use different tools to process design information at various layers (e.g., from behavioral specifications to physical layout of gates).

Once a digital logic design is specified, however, those skilled in the art need not perform substantial experimentation or research to determine those implementations. Rather, those of skill in the art understand procedures to reliably and predictably produce one or more circuit implementations that provide the function described by design information 815. The different circuit implementations may affect the performance, area, power consumption, etc. of a given design (potentially with tradeoffs between different design goals), but the logical function does not vary among the different circuit implementations of the same circuit design.

In some embodiments, the instructions included in design information 815 provide RTL information (or other higher-level design information) and are executable by the computing system to synthesize a gate-level netlist that represents the hardware circuit based on the RTL information as an input. Similarly, the instructions may provide behavioral information and be executable by the computing system to synthesize a netlist or other lower-level design information included in low-level design information 850. Low-level design information 850 may program semiconductor fabrication system 820 to fabricate integrated circuit 830.

The present disclosure includes references to an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent claims that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third," when applied to a feature, do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors, or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, a circuit, or a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), a functional unit, a memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement of such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as a structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used to transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits, or portions thereof, may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. An apparatus, comprising:
- a first phase circuit coupled to a regulated power supply node via a first inductor, wherein the first phase circuit is configured, in response to being activated, to source a first current to the regulated power supply node via the first inductor;
- a second phase circuit coupled to the regulated power supply node via a second inductor, wherein the second phase circuit is configured, in response to being activated, to source a second current to the regulated power supply node via the second inductor, and
- a control circuit configured to:
  - activate, during a first time period, the first phase circuit;
  - measure, during the first time period, at least one parameter of the regulated power supply node to generate a first value;
  - activate, during a second time period, the second phase circuit;
  - measure, during the second time period, the at least one parameter of the regulated power supply node to generate a second value;
  - perform a comparison of the first value and the second value; and
  - adjust one or more operating characteristics of the second phase circuit using a result of the comparison.

2. The apparatus of claim 1, wherein to measure, during the first time period, the at least one parameter, the control circuit is further configured to measure the first current, and wherein to measure, during the second time period, the at least one parameter, the control circuit is further configured to measure the second current.

3. The apparatus of claim 1, wherein to measure, during the first time period, the at least one parameter, the control circuit is further configured to measure a voltage level of the regulated power supply node.

4. The apparatus of claim 1, wherein the control circuit is further configured, in response to an activation of a periodic tuning mode, to:
- measure, during the first time period, the at least one parameter of the regulated power supply node to generate the first value;
- measure, during the second time period, the at least one parameter of the regulated power supply node to generate the second value;
- perform the comparison of the first value and the second value; and
- adjust the one or more operating characteristics of the second phase circuit using the result of the comparison.

5. The apparatus of claim 1, wherein to adjust the one or more operating characteristics of the second phase circuit, the control circuit is further configured to:

generate a trim code using the result of the comparison; and store the trim code in the second phase circuit.

6. The apparatus of claim 1, wherein to measure, during the second time period, the at least one parameter, the control circuit is further configured to:

measure the at least one parameter at a first time point during the second time period to generate a first measurement; and measure the at least one parameter at a second time point during the second time period to generate a second measurement, wherein the second time point is subsequent to the first time point; and determine a change in the at least one parameter using the first measurement and the second measurement to generate the second value.

7. A method, comprising:

activating, by a control circuit during a first time period, a first phase circuit of a plurality of phase circuits included in a multi-phase power converter circuit, wherein the first phase circuit is coupled to a regulated power supply node via a first inductor;

measuring, by the control circuit during the first time period, at least one parameter associated with the regulated power supply node to generate a first value;

activating, by the control circuit during a second time period, a second phase circuit of the plurality of phase circuits, wherein the second phase circuit is coupled to the regulated power supply node via a second inductor;

measuring, by the control circuit during the second time period, the at least one parameter of the regulated power supply node to generate a second value;

performing, by the control circuit, a comparison of the first value and the second value; and adjusting, by the control circuit, one or more operating characteristics of the second phase circuit using a result of the comparison.

8. The method of claim 7, wherein measuring, by the control circuit during the first time period, the at least one parameter includes measuring a first current sourced by the first phase circuit to the regulated power supply node, and wherein measuring, by the control circuit during the second time period, the at least one parameter includes measuring a second current sourced by the second phase circuit to the regulated power supply node.

9. The method of claim 7, wherein measuring, by the control circuit during the first time period, the at least one parameter includes measuring a voltage level of the regulated power supply node.

10. The method of claim 7, further comprising, in response to activating a periodic tuning mode:

measuring, by the control circuit during the first time period, the at least one parameter to generate the first value;

measuring, by the control circuit during the second time period, the at least one parameter to generate the second value;

performing, by the control circuit, the comparison of the first value and the second value; and adjusting, by the control circuit, the one or more operating characteristics of the second phase circuit using the result of the comparison.

11. The method of claim 7, wherein adjusting the one or more operating characteristics of the second phase circuit includes:

generating, by the control circuit, a trim code using the result of the comparison; and storing, by the control circuit, the trim code in the second phase circuit.

12. The method of claim 11, further comprising adjusting, by the second phase circuit using the trim code, a size of a driver transistor included in the second phase circuit, wherein the driver transistor is coupled to the second inductor.

13. The method of claim 7, wherein the first phase circuit is located on a first integrated circuit, and wherein the second phase circuit is located on a second integrated circuit.

14. A system, comprising:

a first integrated circuit that includes a first phase circuit coupled to a regulated power supply node via a first inductor, wherein the first phase circuit is configured, in response to being activated, to source a first current to the regulated power supply node via the first inductor; and a second integrated circuit that includes:

a second phase circuit coupled to the regulated power supply node via a second inductor, wherein the second phase circuit is configured, in response to being activated, to source a second current to the regulated power supply node via the second inductor; and a control circuit configured to:

activate, during an initial time period, the second phase circuit;

measure, during the initial time period, at least one parameter of the regulated power supply node to generate an initial value;

activate, during a different time period, the first phase circuit;

measure, during the different time period, the at least one parameter of the regulated power supply node to generate a different value;

perform a comparison of the initial value and the different value; and adjust one or more operating characteristics of the first phase circuit using a result of the comparison.

15. The system of claim 14, wherein to measure, during the initial time period, the at least one parameter, the control circuit is further configured to measure the second current, and wherein to measure, during the different time period, the at least one parameter, the control circuit is further configured to measure the first current.

16. The system of claim 14, wherein to measure, during the initial time period, the at least one parameter, the control circuit is further configured to measure a voltage level of the regulated power supply node.

17. The system of claim 14, wherein to adjust the one or more operating characteristics of the first phase circuit, the control circuit is further configured to:

generate a trim code using the result of the comparison; and store the trim code in the second phase circuit.

18. The system of claim 14, wherein to measure, during the different time period, the at least one parameter, the control circuit is further configured to:

measure the at least one parameter at a first time point during the different time period to generate a first measurement;

measure the at least one parameter at a second time point during the different time period to generate a second measurement, wherein the second time point is subsequent to the first time point; and determine a change in the at least one parameter using the first measurement and the second measurement to generate the different value.

19. The system of claim 14, wherein the first phase circuit is trimmed, and wherein the second phase circuit is untrimmed.

20. The system of claim 14, wherein the first integrated circuit and the second integrated circuit are mounted on a common substrate.

* * * * *